United States Patent [19]

Coleman

[11] Patent Number: 5,647,212

[45] Date of Patent: Jul. 15, 1997

[54] MASTER CYLINDER RESERVOIR ASSEMBLY

[75] Inventor: John Russell Coleman, Dayton, Ohio

[73] Assignee: General Motors Corporation, Detroit, Mich.

[21] Appl. No.: 672,001

[22] Filed: Jun. 24, 1996

[51] Int. Cl.⁶ .................................................. B60T 11/20
[52] U.S. Cl. ........................... 60/562; 60/584; 60/585; 60/588
[58] Field of Search .......................... 60/562, 584, 588, 60/592

[56] References Cited

U.S. PATENT DOCUMENTS

| | | | |
|---|---|---|---|
| 3,914,943 | 10/1975 | Lewis | 60/585 |
| 4,004,425 | 1/1977 | Pickering | 60/562 |
| 4,127,210 | 11/1978 | Sabat | 60/592 |
| 4,319,456 | 3/1982 | Kubota | 60/562 |
| 4,497,176 | 2/1985 | Rubin et al. | 60/584 |
| 4,694,652 | 9/1987 | Coleman | 60/585 |

FOREIGN PATENT DOCUMENTS

| | | | |
|---|---|---|---|
| 83648 | 6/1980 | Japan | 60/585 |

*Primary Examiner*—F. Daniel Lopez
*Attorney, Agent, or Firm*—Jeffrey A. Sedlar

[57] ABSTRACT

A dual acting master cylinder and reservoir assembly includes a pair of bayonets on the reservoir that are received within primary and secondary bosses of the master cylinder. The bayonets each include disks within their central openings wherein each disk has a control orifice for controlling the pressure rise in the associated primary and secondary braking circuits during the initial filling process of the master cylinder and reservoir assembly. Through means of the control orifices, the initial filling process of the braking system through the reservoir is effected while minimizing pressure differential establishment across the secondary piston.

6 Claims, 1 Drawing Sheet

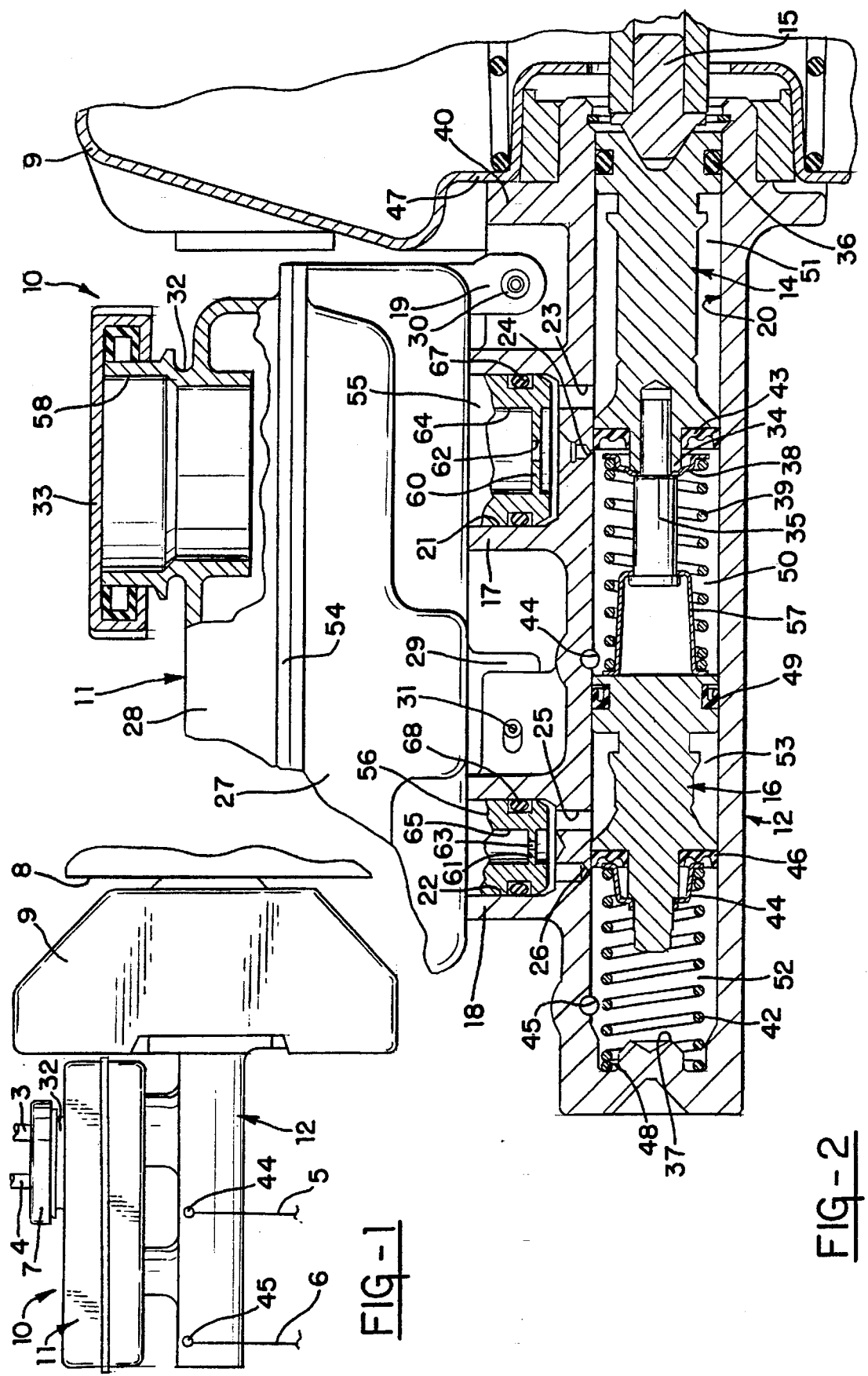

MASTER CYLINDER RESERVOIR ASSEMBLY

BACKGROUND OF THE INVENTION

The present invention relates to a master cylinder reservoir assembly and more particularly, to a dual acting master cylinder reservoir assembly for use in a braking system of a motor vehicle.

Dual acting master cylinders are known and generally comprise a primary section and a secondary section each having a low pressure chamber and a high pressure chamber separated by a slidable piston. The primary and secondary pistons are aligned within a common bore and engage each other. A spring is compressed between the primary piston and the secondary piston such as to maintain a relative maximum separation between the two pistons. A retaining ring engageable by the primary piston retains the slidable components of the master cylinder assembly within the bore. A second spring acts on the secondary piston to bias the two pistons towards the retaining ring.

Both the primary and secondary sections of the dual acting master cylinder are supplied with hydraulic fluid by a reservoir which is carried on the master cylinder. The reservoir includes a pair of bayonets that are received within bosses integrally formed on the master cylinder, one each at the primary and secondary sections. A compensation port and a relatively small bypass hole provide fluid communication between each of the primary and secondary sections and the bayonets of the reservoir at each of the bosses.

Elastomeric seals are mounted on the pistons and allow a passage of hydraulic fluid from the low pressure chambers to the high pressure chambers but not in the reverse direction to compensate for return movement of the piston and for brake pad or shoe wear. The compensation ports generally provide fluid communication between the reservoir and the low pressure chambers of the primary and secondary sections of the master cylinder. The bypass holes generally provide fluid communication between the primary and secondary high pressure chambers and the reservoir when the pistons are in an at-rest position. When the master cylinder is actuated and the pistons moved to brake apply positions, the elastomeric seals move past the bypass holes so that the bypass holes are closed to the high pressure chambers.

The bypass holes are necessarily small to reduce the dead stroke of the dual acting master cylinder assembly, (where dead stroke is the loss of stroke between brake pedal movement and pressure build up). The use of a dual acting master cylinder and reservoir assembly in a motor vehicle provides two independent hydraulic circuits wherein a primary circuit is supplied by the primary section of the master cylinder through an outlet opening in communication with the primary high pressure chamber and a secondary circuit is supplied by the secondary portion of the master cylinder through an opening in communication with the secondary high pressure chamber.

The bayonets of the reservoir are generally provided as open as possible providing essentially unrestricted fluid flow and are sized to be received within the bosses of the master cylinder. Fluid flow between the reservoir and the master cylinder is therefore, determined by the size of the flow paths provided through the compensation ports and the bypass holes rather than by the openings in the bayonets themselves. An annular seal is generally provided on each of the bayonets to sealingly engage the internal bore of the bosses and to prevent fluid escape from the connection between the master cylinder and reservoir.

It is known to assemble the master cylinder and reservoir assembly, along with a power booster to provide a power assist to the manual application of force to actuate the master cylinder, into a motor vehicle and to connect the master cylinder outlet openings to the brake lines of a vehicle. Subsequent to installation within the vehicle, the braking system is filled with fluid through the master cylinder reservoir.

A typical means of filling the braking system with fluid is to introduce a pressurized fluid source into the reservoir and to open the bleed valves at the various wheel brake actuators of the braking system to effect the removal of air from the braking system and the introduction of operating fluid therein. It is also known that as an option to opening the bleed valves at the various wheel actuators it is possible to establish a vacuum in the braking system through the master cylinder and reservoir assembly and then to introduce fluid through the reservoir under pressure to completely fill the braking system without the need of opening the bleed valves at the various wheel brake actuators.

Through means of these known arrangements an effectively operating braking system and a method of assembling a braking system into a vehicle and filling it with fluid is known. The dual acting master cylinder arrangement results in a structure wherein either the primary section or the secondary section is itself adequate for bringing the vehicle to a stop should such operation be necessary.

SUMMARY OF THE INVENTION

It has been found that with a dual acting master cylinder and reservoir arrangement wherein a braking system is filled with fluid under pressure through the reservoir, a condition can occur wherein the flow of fluid to the two braking circuits connected to the primary and secondary sections of the master cylinder can cause the secondary piston to compress the spring between the primary and secondary pistons and be driven backwards as a result of a pressure differential between the two braking circuits. When the secondary piston includes a primary and a secondary seal wherein the secondary seal establishes fluid separation between the primary high pressure chamber and the secondary low pressure chamber, the secondary seal can be caused to move backward past the outlet opening of the primary high pressure chamber in the master cylinder. This can occur, for example, in a braking system wherein the braking circuit connected to the secondary high pressure chamber is completely filled with fluid prior to the braking circuit connected to the primary high pressure chamber. When this happens, the secondary seal of the secondary piston can move into the outlet from the primary high pressure chamber. Such an occurrence can lead to delays in assembly of the braking system and therefore, is undesirable.

Accordingly, it is an object of the present invention to prevent the occurrence of a condition wherein a sufficient pressure differential can exist between the primary and secondary sections of the master cylinder to allow the secondary piston to move backward to a point where the secondary seal travels past or into the outlet opening from the primary high pressure chamber during the initial filling process of the braking system.

To this end, a master cylinder reservoir assembly in accordance with the present invention provides an orificed disk in each of the bayonets of the reservoir wherein the orifices control the flow of fluid to the master cylinder and the remainder of the braking system during the initial fluid filling process of the braking system. More specifically, a master cylinder reservoir assembly according to the present invention operates with a master cylinder having a primary and secondary section wherein each section includes a boss. Each boss receives a bayonet of a reservoir that is matingly engaged with the master cylinder. Within each bayonet is a disk provided as either a separate component or an integrally formed part of the reservoir. Each disk includes at least one orifice to provide proper gauged fluid flow between the reservoir and master cylinder. The orifices are sized to control the pressurization of the braking circuits connected to the primary and secondary sections of the master cylinder during the initial filling process of the braking system. This control mechanism prevents back driving of the secondary piston and therefore, avoids creating delays in the assembly process.

An additional advantage of the disks located in the bayonets of the reservoir is that they result in reinforcement of the bayonet area of the reservoir. This leads to enhancement of design and material selection flexibility for the construction of the reservoir. For example, lighter materials can be used in constructing the reservoir since the disk provides a support member for maintaining an adequate seal between the bayonet and the boss of the master cylinder.

BRIEF DESCRIPTION OF THE DRAWINGS

FIG. 1 is an elevation view of a master cylinder and reservoir assembly.

FIG. 2 is a fragmentary cross sectional illustration of the master cylinder and reservoir assembly of FIG. 1.

DETAILED DESCRIPTION OF THE PRESENTLY PREFERRED EMBODIMENT

Referring to the drawings, illustrated in FIG. 1 is a reservoir and master cylinder assembly designated in the aggregate as 10. Reservoir and master cylinder assembly 10 is mounted on a power booster 9, which is in turn mounted on a mounting surface 8 of an associated vehicle. The master cylinder 12 is connected through outlet openings 44 and 45 to two braking circuits 5 and 6 of the associated vehicle. The master cylinder 12 operates with a primary and secondary section in a dual action manner.

The reservoir 11 is matingly received on the master cylinder 12. The master cylinder and reservoir assembly 10 is assembled in the vehicle as shown, and the master cylinder 12 and braking circuits 5 and 6 are subsequently filled with fluid through the reservoir 11 by means of charging head 7. When the associated braking system supplied through braking circuits 5 and 6 is fully assembled in the vehicle, the charging head 7 is received onto filler neck 32 of reservoir 11 and in the present embodiment a vacuum is pulled in the braking circuits 5 and 6 through the conduit 3. Subsequently, pressurized fluid is introduced into the reservoir 11 through the conduit 4 completely filling the master cylinder 12 and braking circuits 5 and 6. Optionally, rather than establishing a vacuum within the braking system, individual bleed valves (not illustrated), in the braking circuits 5 and 6 are opened and pressurized fluid is introduced through the conduit 4 to the reservoir 11 to completely fill the braking circuits 5 and 6.

By means of the power booster 9, manual application of force to a brake pedal actuator (not illustrated), is transferred to the master cylinder assembly 12. The power booster 9 receives annular leg 40 of master cylinder 12 within annular seat 47. The power booster 9 applies pressure assisted power operation to the master cylinder 12. Master cylinder 12 draws fluid from the reservoir 11 and pressurizes the braking system through the brake circuits 5 and 6. As is conventionally known, the brake circuits 5 and 6 each supply fluid pressure to two wheels of a vehicle in a conventional system arrangement.

When the braking system is initially assembled in an associated vehicle, and the brake line connections made, it becomes necessary to fill the system with braking fluid. This is accomplished by introducing fluid through the master cylinder assembly 12 and particularly, through the reservoir 11.

An evacuation and fill head 7 is placed over the fill opening in filler neck 32 of the reservoir 11. A pump is used to evacuate air from the braking system. In the present embodiment, the pump is operated such that a vacuum of approximately 2 millimeters of mercury is created in the braking system.

After evacuation of the braking system, braking fluid is introduced through charging head 7 and filler neck 32 to the reservoir 11 and the fluid is distributed throughout the braking system. In the present embodiment the system is pressurized to approximately 75 psi. After the filling process is complete, pressure is relieved from the system and the charging head 7 is removed. Through means of the present embodiment, the braking system 10 is completely charged with braking fluid without opening the bleed valves at the wheel brakes.

Referring to FIG. 2, illustrated is a master cylinder assembly designated in the aggregate as 10. The master cylinder assembly 10 includes a master cylinder body 12 formed of an acceptably rigid material such as metal or plastic, and an associating fluid reservoir 11. The master cylinder assembly 10 is responsive to the application of force by booster assembly 9 through the push rod 15.

A longitudinal bore 20 extends through body 12 and slidably carries a dual piston arrangement including primary piston 14 and secondary piston 16. The primary piston 14 is arranged in a subassembly that includes a spring retainer 38 which is slidably retained on piston extension 34 by means of fastener 35. A return spring 39 is carried between spring retainer 38 and spring retainer 57. Spring retainer 57 is carried on piston extension 34 and is maintained in position by fastener 35. The primary piston subassembly also includes a seal 36 carried in a circumferential groove of primary piston 14 and seal 43 carried on piston extension 34. Seals 36 and 43 of primary piston 14 define movable boundaries of primary low pressure chamber 51 and primary high pressure chamber 50 in longitudinal bore 20. The primary piston 14 is operable to selectively pressurize a braking circuit (not illustrated), through the outlet opening 44.

Secondary piston 16 is substantially spool-shaped and is slidably carried in longitudinal bore 20 forward of primary piston 14. Secondary piston 16 is engaged by spring retainer 57 of the primary piston subassembly. A spring retainer 41 is carried on secondary piston 16 and a return spring 42 extends between the spring retainer 41 and the annular spring seat 48 in end 37 of the longitudinal bore 20 biasing the secondary piston 16 toward the primary piston 14.

Secondary piston 16 carries a primary seal 46 fluidly separating longitudinal bore 20 into secondary high pressure chamber 52 and secondary low pressure chamber 53. Secondary piston 16 also carries a secondary seal 49 that separates secondary low pressure chamber 53 from primary high pressure chamber 50 within the longitudinal bore 20. The secondary piston 16 is operable to selectively pressurize a braking circuit (not illustrated), through the outlet opening 45.

Master cylinder body 12 includes integrally formed bosses 17 and 18 which are adapted for connection to reservoir 11. A transverse bore 21 extends into boss 17 and a transverse bore 22 similarly extends into boss 18. A compensation port 23 provides an opening between transverse bore 21 and longitudinal bore 20 between the seal 43 and the seal 36. A bypass hole 24 provides an opening between transverse bore 21 and longitudinal bore 20 into primary high pressure chamber 50. Similarly, a compensation port 25 provides an opening between transverse bore 22 and longitudinal bore 20 into secondary low pressure chamber 53. Additionally, a bypass hole 26 provides an opening between transverse bore 22 and longitudinal bore 20 into secondary high pressure chamber 52. The compensation ports 23 and 25 and the bypass holes 24 and 26 provide fluid routes between the reservoir 11 and the bore 20 of master cylinder body 12.

The reservoir 11 includes an upper body element 28 and a lower body element 27 which are joined together at flange 54 or are optionally formed together as unit. The lower body element includes a pair of legs 19 and 29 which are secured to the master cylinder 12 by fasteners 30 and 31 after the bayonets 55 and 56 are sealingly received within the transverse bores 21 and 22 formed by bosses 17 and 18. The upper body element 28 includes an integrally formed filler neck 32 which provides a fill opening 58 for the reservoir 11. The filler neck 32 receives a cap 33 to close the opening 58.

A seal 67 is interposed between the bayonet 55 and the boss 17 providing a fluid barrier to maintain the integrity of the assembly. Similarly, a seal 68 is interposed between the bayonet 56 and the boss 18.

The bayonet 55 includes a main opening 64 that is formed as large as is practical. A disk 60 extends across the main opening 64, which in the present embodiment is integrally formed with and from the same material that forms the bayonet 55. Optionally, the disk 60 is separately formed and secured or contained within the bayonet 55 by an appropriate means. Similarly, the bayonet 56 includes a main opening 65. A disk 61 extends across the main opening 65 and is integrally formed with the bayonet 56, or optionally fixed therein. The disks 60 and 61 include orifices 62 and 63 respectively.

Since, as stated above, it is disadvantageous for the secondary seal 49 to travel to the right as viewed in FIG. 2 past or into the relatively large outlet opening 44, the orifices 62 and 63 are provided in the reservoir 11 in a manner to prevent the establishment of a significant pressure differential between the primary high pressure chamber 50 and the secondary high pressure chamber 52 across the secondary piston 16 during the initial filling process of the reservoir and master cylinder assembly 10.

In the present embodiment the orifice 63 is 0.125 inches or approximately 3.175 millimeters in diameter. The orifice 62 is 0.1875 inches or approximately 4.76 millimeters in diameter. The relative sizing is selected to control the pressure rise in the braking circuit 6 relative to the pressure rise in the braking circuit 5 during the initial filling process of the master cylinder and reservoir assembly 10 such that the secondary piston 16 is not caused to be driven past or into the outlet opening 44.

Through means of the present invention interference between the secondary seal 49 of secondary piston 16 and outlet opening 44 is prevented during the initial filling process of the master cylinder in reservoir assembly 10. In addition, the presence of disks 60 and 61 within the bayonets 55 and 56 respectively, helps to maintain sealed engagement between the reservoir 11 and master cylinder 12 within the bosses 17 and 18. The seals 67 and 68 are securely maintained in engagement with the bayonets 55, 56 and the bosses 17, 18.

What is claimed is:

1. A master cylinder reservoir assembly comprising:
   a first bayonet having a first main outlet opening and a first disk extending across the first main outlet opening with a first orifice formed in the first disk the first orifice being relatively small in diameter as compared to the first main opening; and
   a second bayonet having a second main outlet opening and a second disk extending across the second main outlet opening with a second orifice formed in the second disk the second orifice being relatively small in diameter as compared to the second main opening wherein the first orifice is larger in diameter than the second orifice.

2. A master cylinder reservoir assembly according to claim 1 wherein the first and second disks are formed as one piece with both the first and second bayonets.

3. A master cylinder reservoir assembly according to claim 1 further comprising a master cylinder having a first and a second boss wherein the first bayonet is received within the first boss and the second bayonet is received within the second boss and comprising a first seal interposed between the first bayonet and the first boss and a second seal interposed between the second bayonet and the second boss.

4. A master cylinder reservoir assembly according to claim 3 further comprising a first and a second braking circuit connected to the master cylinder with a first and a second piston carried in the master cylinder so that the first braking circuit opens into the master cylinder on a first side of the second piston and the second braking circuit opens into the master cylinder on a second side of the second piston wherein the master cylinder and the first and second braking circuits are filled with fluid through the master cylinder reservoir assembly wherein a minimum pressure differential is maintained between the first and second braking circuits by means of the first and second orifices operating to control fluid flow from the master cylinder reservoir assembly to the master cylinder so that the second piston does not move excessively toward the first piston.

5. A master cylinder reservoir assembly according to claim 3 wherein the first disk maintains a fluid tight contact between the first seal and the first bayonet and between the first seal and the first boss and wherein the second disk maintains a fluid tight contact between the second seal and the second bayonet and between the second seal and the second boss.

6. A master cylinder reservoir assembly comprising:
   a reservoir having a first bayonet with a first main outlet opening in the first bayonet and a first disk extending across the first main outlet opening with a first orifice formed in the first disk the first orifice being relatively small in diameter as compared to the first main opening and a second bayonet having a second main outlet opening and a second disk extending across the second main outlet opening with a second orifice formed in the second disk the second orifice being relatively small in diameter as compared to the second main opening wherein the first orifice is larger in diameter than the second orifice;
   a master cylinder having a first and a second outlet opening and having a first and a second boss wherein the first bayonet is received within the first boss and the second bayonet is received within the second boss;

a first seal interposed between the first bayonet and the first boss;

a second seal interposed between the second bayonet and the second boss;

a first and a second braking circuit connected to the first and the second outlet openings respectively, of the master cylinder with a first and a second piston carried in the master cylinder so that the first braking circuit opens into the master cylinder on a first side of the second piston and the second braking circuit opens into the master cylinder on a second side of the second piston, the second piston carrying a piston seal that separates a primary high pressure chamber from a secondary low pressure chamber in the master cylinder wherein the master cylinder and the first and second braking circuits are filled with fluid through the reservoir wherein a minimum pressure differential is maintained between the first and second braking circuits by means of the first and second orifices operating to control fluid flow from the master cylinder reservoir assembly to the master cylinder so that the second piston is limited from moving toward the first piston to a point where the piston seal registers with the first outlet opening to prevent the piston seal from entering the first outlet opening.

* * * * *